United States Patent [19]

Hansen et al.

[11] Patent Number: 5,444,220

[45] Date of Patent: Aug. 22, 1995

[54] ASYMMETRIC INDUCTION WORK COIL FOR THERMOPLASTIC WELDING

[75] Inventors: Karl A. Hansen, Seattle; Edward C. Weisberg, Renton, both of Wash.

[73] Assignee: The Boeing Company, Seattle, Wash.

[21] Appl. No.: 349,647

[22] Filed: Dec. 5, 1994

Related U.S. Application Data

[63] Continuation-in-part of Ser. No. 314,027, Sep. 28, 1994, which is a continuation-in-part of Ser. No. 286,360, Aug. 5, 1994, which is a continuation-in-part of Ser. No. 68,520, May 27, 1993, abandoned, which is a continuation of Ser. No. 777,889, Oct. 18, 1991, abandoned.

[51] Int. Cl.⁶ .......................... H05B 6/40; H05B 6/10
[52] U.S. Cl. ..................................... 219/633; 219/634; 219/670; 219/676; 219/677; 219/656; 156/274.2; 156/380.2
[58] Field of Search ............... 219/633, 634, 670, 656, 219/632, 672, 676, 677; 156/273.9, 274.2, 380.2

[56] References Cited

U.S. PATENT DOCUMENTS

| | | |
|---|---|---|
| 1,725,465 | 8/1929 | Manson .......................... 219/670 |
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,423,922 | 7/1947 | Arnt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 3,101,403 | 8/1963 | Lewis et al. . |
| 3,183,460 | 5/1965 | Bennon . |
| 3,288,979 | 11/1986 | Mills et al. . |
| 3,395,261 | 7/1968 | Leatherman et al. .......... 219/659 |
| 3,431,379 | 4/1969 | Yrene . |
| 3,450,856 | 6/1969 | Buck et al. . |
| 3,472,987 | 10/1969 | Viart .............................. 219/656 |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,091,254 | 5/1978 | Struve . |
| 4,120,712 | 10/1978 | Sindt .............................. 219/633 |
| 4,180,717 | 12/1979 | Lenk et al. . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |
| 4,382,113 | 5/1983 | Schwartz et al. . |

(List continued on next page.)

FOREIGN PATENT DOCUMENTS

0461979B1  4/1994  European Pat. Off. .
54-25542   2/1979  Japan .

OTHER PUBLICATIONS

J. Giachino, Welding Skills and Practices, Am. Tech. Soc., Chicago, Ill. (1960,1965,1967,1971,1976) 393–401.

*Primary Examiner*—Philip H. Leung
*Attorney, Agent, or Firm*—J. C. Hammar

[57] ABSTRACT

An asymmetric coil which has an "A" winding on one pole of the "C" core and a "B" winding of opposite helical twist, on the other pole, we can achieve relatively uniform, intense heating between the poles with relatively insignificant heating outside the poles. Only one core winding is active at one time. This coil allows us to heat uniformly to the ends of the susceptors on the ribs without remelting or overheating the welded area under the abutting spar, as FIG. 6 illustrates. The asymmetry provided by the two windings of opposite helical sense and the core design allows us to travel in either direction by activating the appropriate coil.

10 Claims, 4 Drawing Sheets

U.S. PATENT DOCUMENTS

| | | |
|---|---|---|
| 4,416,713 | 11/1983 | Brooks . |
| 4,421,588 | 12/1983 | Davies . |
| 4,445,951 | 5/1984 | Lind et al. . |
| 4,521,659 | 6/1985 | Buckley et al. .............. 219/633 |
| 4,653,396 | 3/1987 | Wennerberg . |
| 4,673,450 | 6/1987 | Burke ...................... 156/273.9 |
| 4,768,433 | 9/1988 | Boissevain . |
| 4,822,972 | 4/1989 | Sugioka et al. . |
| 4,897,518 | 1/1990 | Mucha et al. . |
| 4,904,972 | 2/1990 | Mori et al. . |
| 4,919,759 | 4/1990 | Ilmarinen et al. . |
| 4,947,464 | 8/1990 | Mori et al. . |
| 4,978,825 | 12/1990 | Schmidt et al. ............ 219/633 |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,250,776 | 10/1993 | Pfaffmann . |
| 5,283,409 | 2/1994 | Brendel et al. . |
| 5,313,034 | 5/1994 | Grimm et al. ............. 219/634 |
| 5,313,037 | 5/1994 | Hansen et al. ............ 219/633 |
| 5,347,107 | 9/1994 | Iguchi et al. .............. 219/670 |

ASYMMETRIC INDUCTION WORK COIL FOR THERMOPLASTIC WELDING

REFERENCE TO RELATED APPLICATIONS

This application is a continuation-in-part application based upon U.S. patent application Ser. No. 08/314,027, filed Sep. 28, 1994, which was a continuation-in-part application based upon U.S. patent application Ser. No. 08/286,360, filed Aug. 5, 1994, which was a continuation-in-part application based upon U.S. patent application Ser. No. 08/068,520, filed May 27, 1993, now abandoned, which was a continuation application based upon U.S. patent application Ser. No. 07/777,888, filed Oct. 18, 1991, now abandoned. We incorporate these earlier patent applications by reference.

TECHNICAL FIELD

This invention relates in general to induction welding of multiple plies of thermoplastic materials to form a thermoplastic fusion bond and, in particular, to an asymmetric induction work coil for producing heat along the bond line.

BACKGROUND ART

The exponential decay of the strength of magnetic fields dictates that, in induction welding processes, the structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some cases, destruction or denaturing of the resin. To avoid overheating of the outer plies and to insure adequate heating of the inner plies, a susceptor of significantly higher conductivity than the fibers is used to peak the heating selectively at the bond line of the plies when heating from one side. An electromagnetic induction coil on one side of the assembly heats a susceptor to melt and cure a thermoplastic resin (also sometimes referred to as an adhesive) to bond the elements of the assembly together. Often the current density in the susceptor is higher at the edges of the susceptor than in the center because of the nonlinearity of the coil. This problem typically occurs when using a cup core induction coil like that described in U.S. Pat. No. 5,313,037 and can result in overheating the edges of the assembly or underheating the center, either condition leading to inferior welds because of non-uniform curing. It is necessary to have an open or mesh pattern in the susceptor to allow the resin to bond between the composite elements of the assembly when the resin heats and melts.

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding (i.e., gluing the parts together) requires complicated surface pretreatments, and produces a distinct interface between the part and adhesive rather than a fusion bond which welding produces.

Thermoplastic welding, which eliminates fasteners, features the ability to join thermoplastic composite components at high speeds with minimum touch labor and little, if any, pretreatments. In our experience, the welding interlayer, called a susceptor, also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

There is a large stake in developing a successful induction welding process suitable for making aerospace composites. Its advantages versus traditional composite joining methods are:
reduced parts count versus fasteners
minimal surface preparation, in most cases a simple solvent
wipe to remove surface contaminants
indefinite shelf life at room temperature
short process cycle time, typically measured in minutes
enhanced joint performance, especially hot/wet and fatigue
permits rapid field repair of composites or other structures.
There is little or no loss of bond strength after prolonged exposure to environmental influences.

Thermoplastic welding is a process for forming a fusion bond between two faying thermoplastic faces of two parts. A fusion bond is created when the thermoplastic on the surface of the two parts is heated to its melting or softening point and the two surfaces are brought into contact, so that the thermoplastic mixes together, and the surfaces are held in contact while the thermoplastic cools below the softening temperature. There is no distinct interface in the finished part.

Simple as the process sounds, and easy as it is to perform in the laboratory on small pieces, it becomes difficult to perform reliably and repeatably in a real factory on full-scale parts to build a large structure such as an airplane wing box. The difficulty is in getting the proper amount of heat to the bond line without overheating the entire structure and also in achieving intimate contact of the faying surfaces of the two parts at the bond line during heating and cooling despite the normal imperfections in the flatness of composite parts, thermal expansion of the thermoplastic during heating to the softening or melting temperature, flow of the thermoplastic out of the bond line under pressure, and then contraction of the thermoplastic in the bond line during cooling.

One technique for getting heat to the bond line in a thermoplastic welding assembly is to include a conductive layer or article, known as a "susceptor," between the two surfaces to be welded, and to heat the susceptor by resistive heating so that the susceptor functions as a bond line heat source to melt or soften the thermoplastic at the bond line for fusion of the faying surfaces of the two surfaces. The electric current for heating the susceptor can be in the form of eddy currents generated inductively, as taught for example by U.S. Pat. Nos.

3,395,261 and 4,978,825, or it can be conducted directly to the susceptor through tabs or the like as shown in U.S. Pat. No. 5,313,034.

U.S. Pat. No. 4,673,450 describes a method to spot weld graphite fiber reinforced PEEK composites using a pair of electrodes. After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Additional techniques for thermoplastic welding with induction heating are illustrated in U.S. Pat. No. 3,996,402 and 4,120,712, where the metallic susceptors of conventional type have a regular pattern of openings of traditional manufacture, being generally circular holes in the metal sheet with a relatively small open area fraction. Achieving a uniform, controllable temperature in the bond line, which is crucial to preparing a thermoplastic weld of adequate integrity to permit use of welding in aerospace primary structure, is difficult with conventional coils or conventional susceptors, as we discussed and illustrated in our copending U.S. patent application Ser. No. 08/068,520.

In U.S. patent application Ser. Nos. 08/286,360 and 08/068,520, we described a tailored susceptor for approaching the desired temperature uniformity. This susceptor relied upon carefully controlling the geometry of openings in the susceptor (both their orientation and their spacing) to distribute the heat evenly. For example, we suggested using a regular array of anisotropic, diamond shaped openings with a ratio of the length (L) to the width (W) greater than 1 to provide a superior weld over that achieved using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A susceptor having openings with a length (L) to width (W) ratio of 2:1 has a longitudinal conductivity about four times the transverse conductivity so current is more likely to flow longitudinally in the susceptor rather than transversely. In addition to tailoring the shape of the openings to tailor the susceptor, we altered the current density in regions near the edges by increasing the foil density (i.e., the absolute amount of metal). Increasing the foil density along the edge of the susceptor increases the conductivity along the edge and reduces the current density and the edge heating. We increased foil density by folding the susceptor to form edge strips of double thickness or by compressing openings near the edge of an otherwise uniform susceptor. We found these susceptors difficult to reproduce reliably. Also, their use forced careful placement and alignment along the bond line to achieve the desired effect.

Our tailored susceptor was designed for use with the cup core of U.S. Pat. No. 5,313,037. With this coil, the magnetic field is strongest near the edges of the susceptor because the central pole creates a null in the center. Therefore, the tailored susceptor is designed to counter the field by accommodating the higher induced current near the edges. The high longitudinal conductivity encourages induced currents to flow longitudinally. The cup coil of U.S. Pat. No. 5,313,037 creates a strong magnetic field ahead of and behind the coil as it travels along the bond line, which functions to preheat the bond line ahead of the coil or to slow the cooling behind the coil. The slowed cooling allows us to keep the thermoplastic molten while we press the parts together with the trailing pressure plate of a skate that carries the coil in the welding operation. We obtain a strong weld. Preheating with the field ahead of the coil also seems to provide improved results. The welding process and equipment, especially the skate, are more fully described in copending U.S. patent application Ser. No. 08/352,991 by John Mittleider et al., which we incorporate by reference. Alignment of the coil over the tailored susceptor is critical to achieve quality results, but precision alignment within about 0.040 in is difficult to achieve and to maintain.

The selvaged susceptor for thermoplastic welding that we described in U.S. patent application Ser. No. 08/314,027 controls the current density pattern during eddy current heating by an asymmetric induction work coil of the present invention to provide substantially uniform heating to a composite assembly and to insure the strength and integrity of the weld in the completed part. This selvaged susceptor is particularly desirable for welding ribs between prior welded spars because of the control of the heating that we achieve with the asymmetric induction work coil. While designed for the asymmetric work coil, the selvaged susceptor can also be used with the cup coil where it allows wider misalignment between the coil and susceptor because of the high conductivity selvage edge strips.

The power (P) or power density which the susceptor dissipates as heat follows the well-known equation for power loss in a resistor: $P=(J^2)(R)$ wherein J is the eddy current (or its density) and R is the impedance (i.e., resistance) of any segment of the eddy path. The heating achieved directly corresponds to the power (or power density).

We achieve better performance (i.e., more uniform heating) in rib welding by using a selvaged susceptor having edge strips without openings. This susceptor is described in more detail in U.S. patent application Ser. No. 08/314,027. It has a center portion with a regular pattern of openings and solid foil edges, which we refer to as selvage edge strips. We embed the selvaged susceptor in a thermoplastic resin to make a susceptor/resin tape that is easy to handle and to use in assembling (i.e., preforming) the composite pieces prior to welding. Also, we have discovered that, with a selvaged susceptor, the impedance of the central, mesh or grid portion of the susceptor should be anisotropic with a lower transverse impedance than the longitudinal impedance. Here, the L/W ratio of diamond shaped openings should be less than or equal to one. That is, unlike our tailored susceptor, L should be less than W in the selvaged susceptor. With this new selvaged susceptor we encourage the current to flow across the susceptor to the edges where the current density is lowest and the conductivity, highest, and the current flow remains primarily under the coil because of the asymmetric field. We achieve reliable welds, especially on ribs, because the asymmetric induction work coil of this invention generates a magnetic field of high field strength between its poles and low field strength outside its poles. Containing the magnetic field between the poles allows us to direct the heating to a precise location and allows us to complete the rib welds at the beginning and end of runs without remelting the thermoplastic under the spars. Ahead of the coil, there is a magnetic field of low field strength to preheat the susceptor, similar to the cup coil. Behind the asymmetric coil, there is essentially no magnetic field, which is how we achieve controlled heating at the beginning and ending of welding runs.

For the production of complex aerospace structure, such as composite wingboxes in which composite skins are joined to longitudinal spars and transverse ribs, completing rib welds is troublesome with a cup coil like the one in U.S. Pat. No. 5,313,037. The "cup" coil produces a magnetic field that spreads too far ahead of and too far behind the coil so that, in trying to ensure that the edges of the rib at the beginning or end of a run were fully welded, the magnetic field with the "cup" coil induces substantial currents in the susceptors over the spars and resoftens those welds. To overcome this problem we use the asymmetric induction work coil that permits complete welding of the ribs without softening occurring over the adjoining spars.

SUMMARY OF THE INVENTION

The asymmetric induction work coil of the present invention, then, is a "C" core design having a "A" pole and a "B" pole. A first helical winding is wrapped around the "A" pole while a second helical winding of opposite twist is wrapped around the "B" pole. We activate one winding at a time and in so doing obtain a magnetic field distribution under the coil of the general type shown in FIG. 5. There is a relatively weak negative field ahead of the "A" pole which projects forward into the region where the coil will travel when it moves along the bond line in the welding operation. This field tends to preheat the bond line. Between the poles, there is a relatively strong magnetic field that heats the bond line under the coil as the coil moves along. Trailing the coil outside the "B" pole the field drops to essentially zero. As shown in the thermogram of FIG. 6, this coil allows complete heating to the end and edges of a rib susceptor without softening the previously welded area under the spar. The two coils permit travel in either direction, which simplifies the welding operation. To change the direction of travel, the window on pole "A" is deactivated and that on pole "B" activated to flip the magnetic field distribution to essentially its mirror image.

The coil is generally rectangular in plan view with a length greater than the width of the susceptor. In this way the magnetic field that the coil creates substantially overlies the area where heating is desired. The spacing between the poles is sufficient to lend stability to the coil when it rests on the workpiece, but this dimension is not as critical as the coil's length. The width does influence the field strength, so we try to minimize this dimension while achieving a reasonable "oven region" underlying the coil between the poles where the weld heating will occur. Each pole is sized to avoid magnetic saturation and to permit the windings, but the pole dimensions otherwise are not too exacting.

DETAILED DESCRIPTION

Figure 1:
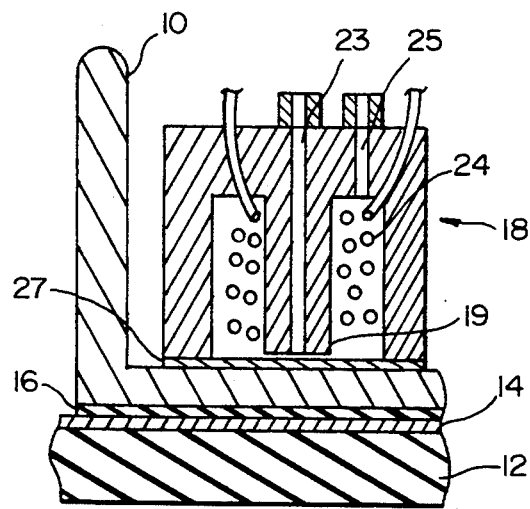
FIG. 1 is a cross sectional schematic of a typical thermoplastic welding process.
Figure 5:
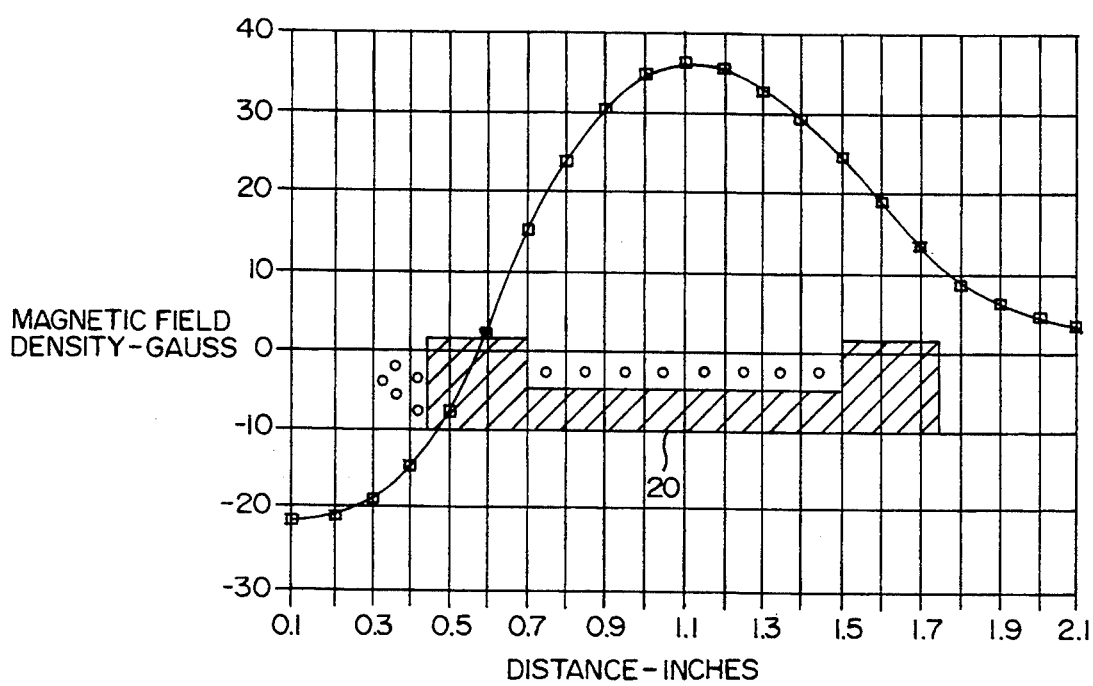
FIG. 5 is a graph plotting the magnetic field distribution achieved with the asymmetric induction work coil.

In FIG. 1, to form a thermoplastic weld, a selvaged susceptor 14 embedded in a thermoplastic resin 16 is inserted between composite parts 10 and 12. A moving induction coil 18 induces eddy currents in the susceptor 14 which results in heating the assembly uniformly to melt and to cure the resin. The preferred induction coil is a "C" core design (FIGS. 7 & 8, which will be described later in more detail) that activates windings around one pole of the "C" to produce an asymmetric field of high strength in a controlled area (FIG. 5). FIG. 1, however, illustrates welding using a cup core induction coil 18 of the type we described in U.S. Pat. No. 5,313,037, where windings 21 surround a central pole 19. A cooling water port 23 penetrates the central pole and communicates with a channel defined by a nylon faceplate 27 and the outer periphery of the high permeability core. Exit port 25 permits circulation of water from the coil.

Figure 6A:
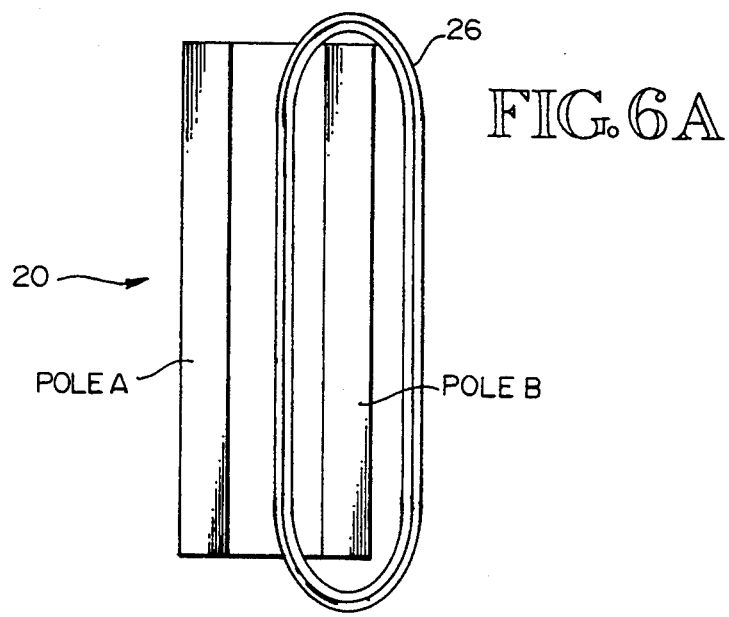
FIG. 6 schematically illustrates a rib welding operation, showing a typical thermogram we achieve using our asymmetric induction work coil.
Figure 6B:
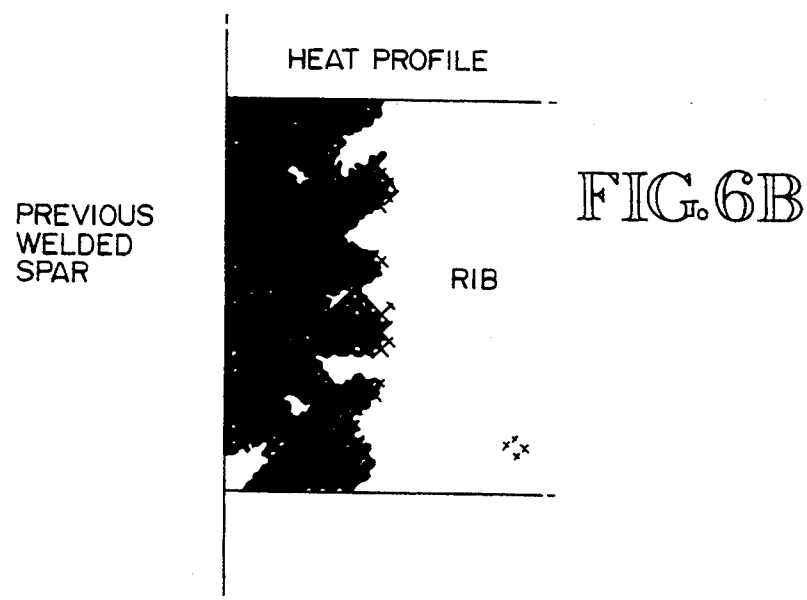
Figure 6C:
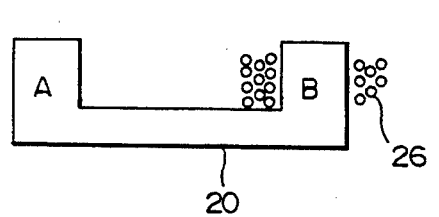

With the preferred asymmetric coil, we achieve uniform temperatures across the selvaged susceptor in the "oven region" under the poles of the "C" as the coil moves (in the case shown in FIGS. 5 & 6 from left to right). The present invention uses a susceptor that includes solid metal selvage strips 30 along both lateral edges. By moving the asymmetric coil along a rib seam at a predetermined rate, we can maintain a uniform heating pattern and form a high quality weld. We start at one end and travel toward the center. Somewhere in the middle of the run, we stop and move the coil to the other end where we activate the other winding and move the coil in the opposite direction toward the center to complete the weld pass, overlapping slightly in the middle of the spar or rib.

The selvaged susceptor 14 is fabricated from a copper foil having a thickness of from 0.003–0.010 in (0.075–0.25 mm). Any material having good electrical conductivity may be used. Our susceptor has a pattern of openings (usually diamonds) made by conventional methods such as etching, stamping, or expansion. The susceptor can also be nickel, copper-coated nickel, or another suitable metal. We use diamond shapes with uniform line widths of about 7 mils (0.18 mm) to define the peripheries of the diamonds. The diamonds can have L/W ratios less than or equal to 1.0. Other shapes can be used to create a susceptor that has a uniform impedance in the longitudinal and transverse directions or, for welding with the asymmetric coil, one where the traverse impedance is lower than the longitudinal impedance.

Figure 2:
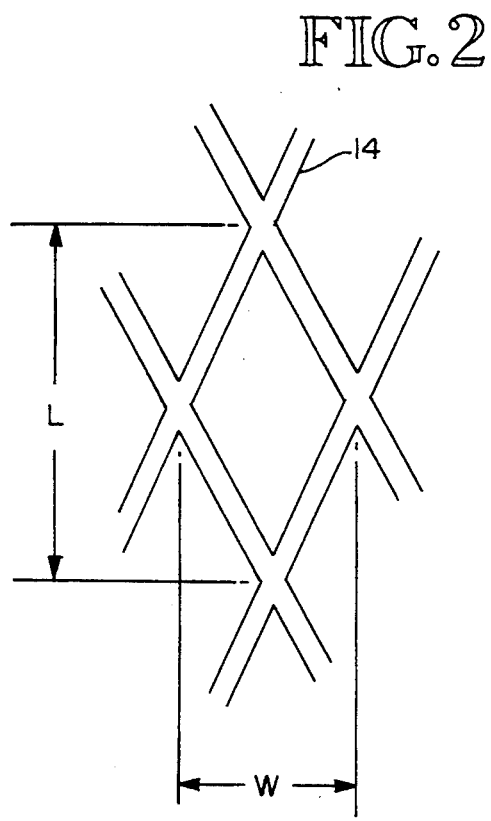
FIG. 2 is a detail of openings in a susceptor.

The ratio of length to width (L/W) (FIG. 2) for the susceptor affects the susceptor's heating and the quality of the weld. Having higher transverse impedance influences the induced current to flow transversely in the path of least resistance toward the selvaged edges 30.

Once in the edges, the conductivity is the highest and the current density the lowest, so the eddies can turn easily.

Figure 3:
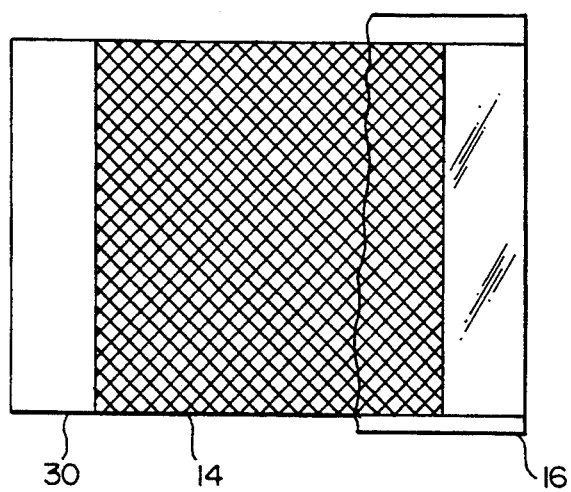
FIG. 3 is a plan view of a selvaged susceptor.
Figure 4:
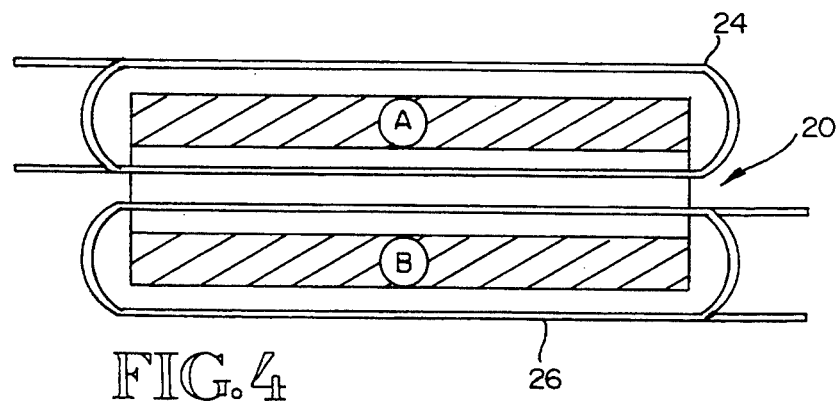
FIG. 4 is a schematic plan view of an asymmetric induction work coil generally used with our selvaged susceptor.

We modify the lateral edges of the susceptor as shown in FIG. 3 to adjust the current density. We seek to accommodate a higher current density at the edges so that the edges will produce a proportionately lower eddy current for a constant field strength. The edges have solid copper selvage strips 30, devoid of openings, to maximize the current density in the edge region while the center has the characteristic diamond pattern of openings. Using solid selvage edge strips is better, especially at the beginning and end of a weld run where the dwell of the coil can introduce thermal discontinuities that we avoid when we are moving the coil slowly along the weld seam. Using an asymmetric coil which has an "A" winding on one pole of the "C" core and a "B" winding of opposite helical twist on the other pole (FIGS. 7 & 8), we can achieve relatively uniform, intense heating between the poles with relatively insignificant heating outside the poles (or, at least, on one side of the coil). Only one coil winding is active at one time. The typical magnetic field distribution for this asymmetric coil is shown in FIG. 5. This coil allows us to heat uniformly to the edges of susceptors on the ribs without remelting or overheating the welded area under the abutting spar, as FIG. 6 illustrates, where the thermogram at the center of the figure shows relatively uniform heating on the rib in the oven zone with only nominal heating behind the coil where the spar previously was welded. The asymmetry provided by the two windings of opposite helical sense and the core design allows us to travel in either direction with start-up or finish without significant heating under the previously wlded spar. This control is desirable for making sound welds in which we have confidence. Thermal discontinuities mean welds of differing characteristics which can, from the uncertainty of quality, cause designers to question the integrity of the structure. Using solid edge selvage strips 30 as shown in FIG. 3, we have minimized thermal discontinuities (especially at the start or finish of the weld) and produce better welds more consistently. The edge strips are in the order of 1.0–15.0 mm (generally 10–15 mm), and usually are outside the bond line. The open center portion is essentially the same width as the cap of the spar or rib, and the edge strips extend outside the spare cap width. Welding does not occur under the edge strips 30 and the strips can be removed after welding is finished. Of course, the edge strips can be even wider, but that simply wastes metal.

Figure 7:
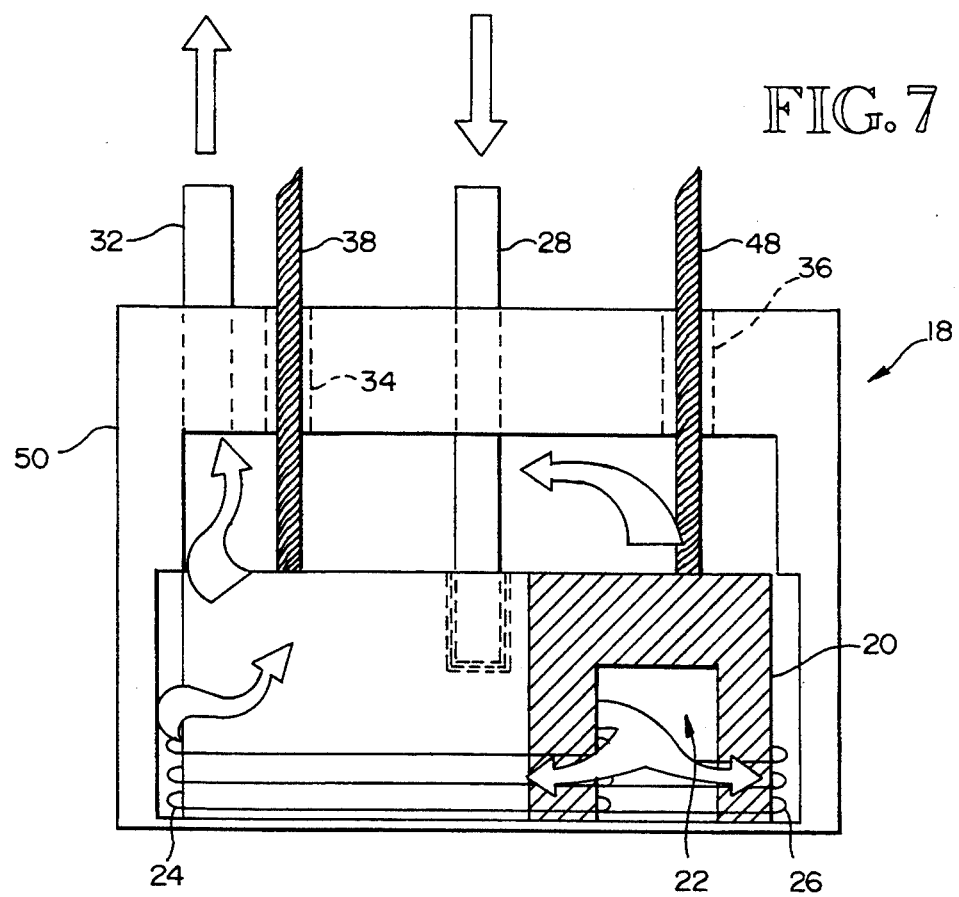
FIG. 7 is a perspective view, partially in cutaway, showing our preferred asymmetric induction work coil.
Figure 8:
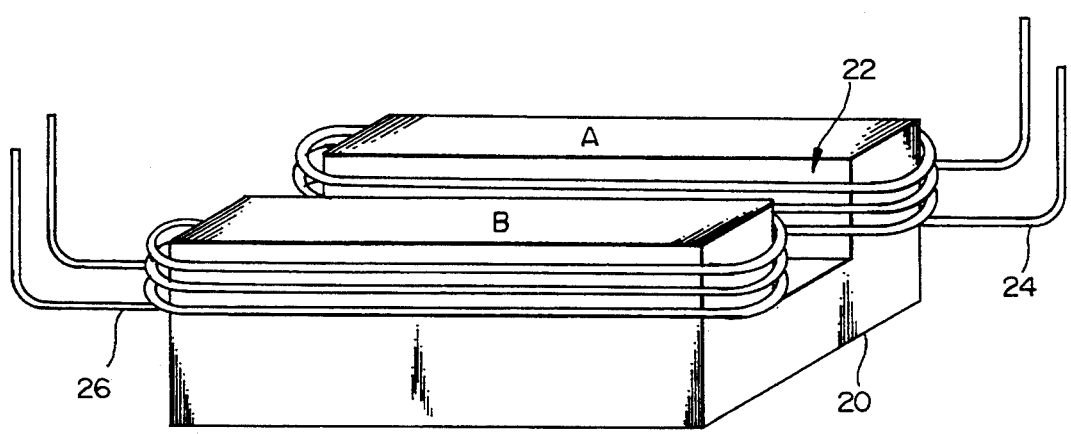
FIG. 8 is a perspective view on an inverted "C" core showing the windings on the "A" and "B" poles.

FIGS. 7 and 8 show our preferred work coil in greater detail. FIG. 7 shows this coil in partial cutaway. First, a portion of the outer housing 50 is cutaway to expose the core 20. Then, the right end of the core 20 also is cutaway to reveal the windings 24 and 26 on poles "A" and "B," respectively, and the inner channel 22 that the two poles form in the foot of the core. As previously described, the coil 18 has a "C" core 20 of high magnetic permeability. FIG. 8 shows the core 20 inverted with the two poles and their respective windings with the channel between the poles open upwardly. We use Ferrotron ferromagnetic plastic for the core 20 because it provides high permeability with relative ease of machining. The core 20 is generally a right rectangular solid having a channel 22 cut in its foot side to define two poles "A" and "B." The core's length is about 0.2 inches wider than the susceptor. In this way, the need for precise alignment of the coil over the susceptor is alleviated because the core produces transverse eddies across the susceptor for the width of the selvage edge strip plus about 0.4 inches, and, perhaps, even more deviation. It is hard to be displaced as much as one-half inch far in aerospace manufacturing without noting the deviation from the preferred path.

Each pole is thick enough to avoid saturation when the respective winding 24 or 26 for that pole is activated. The poles are spaced apart far enough to make the foot stable. The spacing defines the channel in the foot, the width of which is not critical. The overall width of the core defines the "oven region" for intense heating as we will explain.

Each winding 24 or 26 are made from Litz wire to maximize the current density per turn and to maximize the magnetic field. Each winding extends essentially linearly along the faces of the respective pole to produce a field that is essentially perpendicular to the foot.

The core 20 is actively cooled with water being introduced through appropriate tubing 28 into the central channel 22. The water flows outwardly to both ends of the channel 22 and collects around the core 20 in a housing 50 that surrounds the core 20. The typical flow is illustrated with the arrows in FIG. 7. An exit tube 32 carries the hot water to a cooler (heat exchanger; not shown) for recycling or, more commonly, to a drain for disposal. The water flowrate is adjusted to control the temperature of the core 20. Sealed ports 34 and 36 extend through the housing 50 for the Litz wire leads 38 and 40 for the respective windings.

The number of turns depends upon the power input and the desired maximum heating temperature and control sensitivity. Those skilled in the art will understand the possible trades. We typically use about 20 turns to achieve the high inductance we desire for rapid heating.

The channel height is usually about 0.5–0.75 inches, but this dimension can vary within wide bounds. The height of the core from foot to top is about 0.5 inches greater than the height of the channel.

The depth of penetration of the magnetic field is directly proportional to the frequency. Lower frequencies penetrate deeper. We use a frequency of about 20–50 kHz (usually 30 kHz).

Our goal is to produce aircraft structure that eliminates fasteners. Welded structure will be far less expensive because welding eliminates the labor to drill holes accurately and to inspect the fasteners after installation. We also will avoid other problems that fasteners introduce, such as sealing around the fastener and the holes, mismatch of materials, and arcing from the fasteners. To replace the fasteners, however, requires confidence that the welds are uniform and consistent, because a failure at any weak point in the weld could lead to catastrophic unzipping of the entire welded structure. The present invention, then, focuses upon one of the most important problems, temperature uniformity along the bond line to achieve uniform and complete melt and cure of the resin. A typical application would be welding a wingskin to the underlying spars or ribs, and especially the rib weld process.

As mentioned earlier, we embed the susceptor in the resin to simplify the welding process. Making a susceptor/resin tape eliminates the steps of applying separate layers of resin between the respective elements in a composite-susceptor-composite assembly. It also ensures that there will always be adequate resin proximate the susceptor and essentially uniform resin thickness across the welding bond line. Our typical tape is about 2 inches wide with KIII Avimid resin (an aromatic polyimide), although we can use PEEK, PEKK, PES, or any other thermoplastic. The resin must be compatible with the matrix resin in the composite and generally is the same resin as the matrix resin when welding thermoplastic composites. For welding thermoset composites, the resin will likely be a comparable thermoplastic formulation of the matrix resin in the composites or a compatible resin.

The composites we join with thermoplastic welding are typically the same materials and are prefabricated before the welding. Typically, the composite is a carbon or graphite fiber reinforced KIII, especially KIII B, that has a melt temperature of 310° C. (620° F.). It is resin rich in the region of the bond line because we add sacrificial plies in the areas of the bond line. We complimentary profile the surfaces of the composite parts to ensure a weld free from voids. We assemble the composite parts with the resin/susceptor tape lying along the bond line, and complete the welding by moving the induction coil from one end to the other at about 2–4 inches (5–10 cm) per minute. We can use multiple passes to improve the weld, according to the method of Walker and Peterson described in our copending U.S. patent application Ser. No. 08/367,546. An initial pass to heat the bond line to about 100 deg C., we believe, helps to dry the bond and improves the resulting weld.

The improvement in bond strength with multiple welding passes was discovered fortuitously and was investigated in detail after Walker and Peterson identified it. While we do not yet fully understand the mechanism at work that provides the improved bond strength, we believe it includes the following factors: reduction in bond line thickness, improved ratio of bonded vs. unbonded surface area in the bond line (or expressed conversely, a reduction of the amount of unbonded surface area in the bond line), improved pass-through of bonding resin through the interstices of the susceptor, and improved bonding of the thermoplastic to the susceptor itself. These factors are our best current understanding of the observed phenomenon.

Irregularities such as hollows, depressions, or peaks in the faying surfaces of the parts, and other deviations from perfect flatness can interfere with and prevent continuous intimate contact along the full surfaces of the parts where bonding is intended. These deviations from perfect flatness include small scale surface features such as asperites, depressions or hollows, scratches and bumps, and also large scale features such as waviness in the direction of the major length dimension, twist about the longitudinal axis, dishing or saging of "I" beam flanges, and warping such as humping or bowing in the longitudinal direction.

When the two parts with these surface irregularities in their faying surfaces, are brought together with a susceptor between them, the first pass of the welding head heats the susceptor to about the melting temperature of the thermoplastic faying surfaces of the parts. All of the resin encapsulating the susceptor melts and all of the resin in contact with the susceptor/resin pack also melts, and the pressure exerted on the wing skin in the vicinity of the work coil presses the faying surfaces closer together and extrudes excess resin from the tops of the projecting surface irregularities. However, surface irregularities upstream and downstream of the zone being heated by the coil remain uneven and continue to interfere with perfect intimate contact by the full surface areas of the faying surface. Some of the surface irregularities in the heated zone are melted and flattened in this first pass and the parts are now welded together with some percentage of the bond line faying surfaces fusion bonded together. Some small scale irregularities may remain, preventing full intimate contact of the surfaces, and most of the large scale irregularities may still remain, also preventing some contact. There may be microporosity because of the interference of the surface peaks and valleys.

During the second pass of the welding head, the resin in contact with the susceptor is again heated to the melting or softening temperature by the heated susceptor, and the pressure exerted by the tooling associated with the coil presses the faying surfaces into more intimate contact, extruding additional thermoplastic from the bond line. The projections above the plane of perfect flatness on the two parts are reduced further, and the hollows are partially filled in by melted or softened resin melted off the high points of the surface irregularities.

The selvaged susceptor in conjunction with the asymmetric coil of the present invention permits control of the heating of thermoplastic welding process by tailoring the susceptor shape and edge density according to the needs of the particular assembly to be welded. It is particularly useful for welding ribs between prior welded spars where it is important to complete the weld all the way to the end and edges of the susceptors.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

We claim:

1. An asymmetric induction work coil, comprising:
    (a) a "C" core of high magnetic permeability material defining an "A" pole and a "B" pole spaced apart by a central channel;
    (b) a first winding in a first helical sense wrapped on the "A" pole;
    (c) a second winding in a helical sense opposite that of the first winding wrapped on the "B" pole;
    (d) means for selectively activating the first or second winding; and
    (e) means for actively cooling the core when either winding is activated.

2. The coil of claim 1 wherein the core is a regular rectangular solid with a central channel between the poles.

3. The coil of claim 1 wherein the active cooling means includes a closed housing surrounding the core, a water inlet in fluid communication with the housing for delivering water to the channel of the core, a water outlet in fluid communication with the housing, and means for circulating water to the housing through the inlet and outlet.

4. The coil of claim 1 wherein each winding includes Litz wire to maximize the surface area of wire per unit area and the resulting current density.

5. The coil of claim 1 having a magnetic field distribution substantially of the form graphically illustrated in FIG. 5.

6. A method for welding comprising the steps of:

(a) positioning an induction welding susceptor between faying surfaces of at least two resin composite parts to define a bond line;
(b) aligning an asymmetric induction work coil over the bond line, the coil having a "C" core with two windings, one winding on an "A" pole of the core and the other winding on a "B" pole of the core;
(c) activating a first winding of the coil and moving the coil over the bond line in a first direction at a predetermined rate so that the coil induces eddy currents in the susceptor to heat the bond line to permit a fusion weld between the composite parts;
(d) deactivating the first winding; and
(e) activating the second winding of the coil and moving the coil over the bond line in a direction opposite from the first direction.

7. The method of welding of claim 6 wherein the coil provides an intense area of heating under the coil and between the two poles and a forward area of preheating ahead of the coil in the direction of movement but substantially no heating behind the coil.

8. The method of claim 6 wherein the susceptor is a selvaged susceptor having high conductivity selvage edge strips outside the bond line on either side of the bond line.

9. The method of claim 8 wherein the core is a regular rectangular solid of high magnetic permeability and has a length longer than the width of the bond line.

10. The method of claim 9 wherein each winding includes major sections that extend along the length of the poles and substantially transverse across the bond line when the coil is positioned for welding to induce eddy currents in the susceptor that primarily flow transverse across the susceptor.

* * * * *